(No Model.)
H. G. MANNING.
FLUID PRESSURE VALVE.
No. 479,439. Patented July 26, 1892.
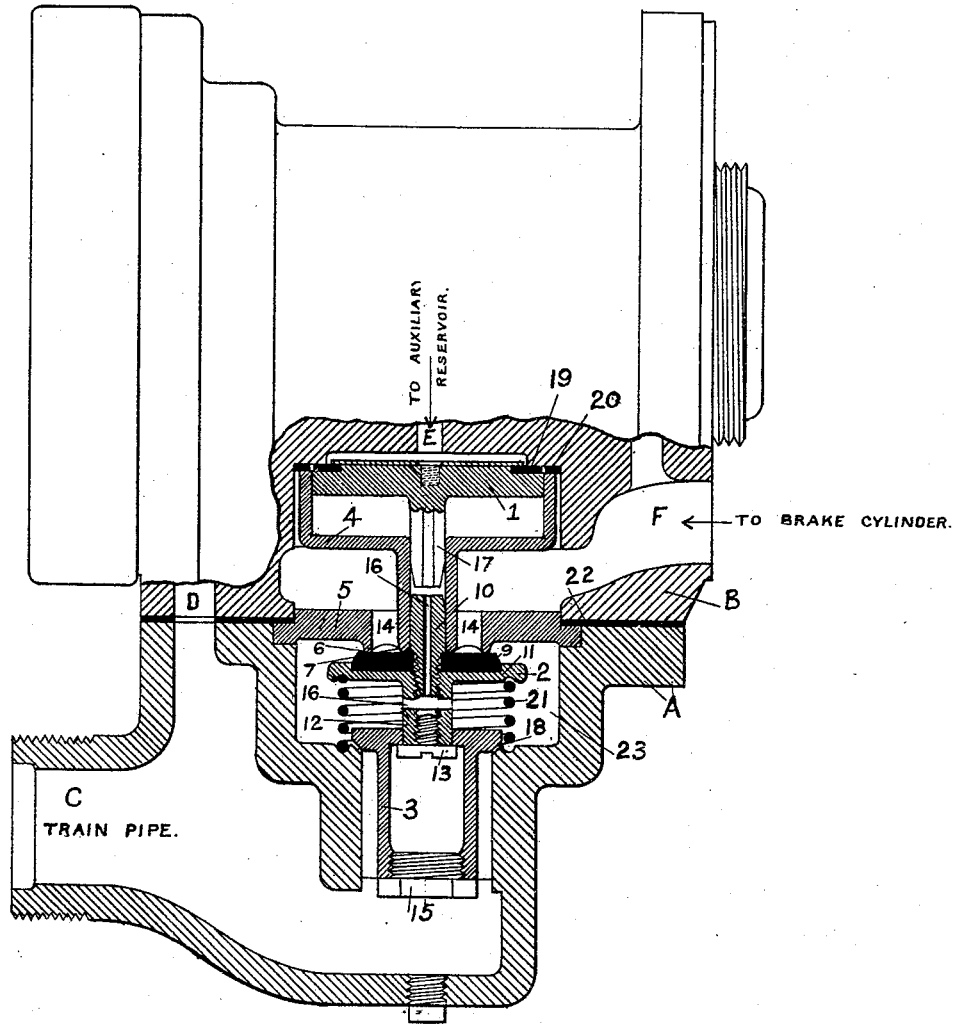
WITNESSES:
C. H. Hungerford
E. A. Manning
INVENTOR
H. G. Manning

UNITED STATES PATENT OFFICE.

HARRY G. MANNING, OF WATERTOWN, NEW YORK, ASSIGNOR TO THE NEW YORK AIR BRAKE COMPANY.

FLUID-PRESSURE VALVE.

SPECIFICATION forming part of Letters Patent No. 479,439, dated July 26, 1892.

Application filed December 5, 1891. Serial No. 414,160½. (No model.)

*To all whom it may concern:*

Be it known that I, HARRY G. MANNING, a citizen of the United States, and a resident of the city of Watertown, in the county of Jefferson and State of New York, have invented a new and useful Improvement in Fluid-Pressure Valves, of which the following is a specification.

This improved valve is particularly applicable to automatic air-brake valves in which it is desired to suddenly apply the brake in case of an emergency where a quick action is needed. It is designed as an attachment to the automatic valves, commonly known as "triple valves," in present use with air-brakes. It can be combined with the body of the triple valve commonly used in making service-stops, as shown in drawing, or it may be connected by piping from what is commonly termed a "plain" triple valve. In the triple valves commonly used at present the quick action is obtained when an emergency-stop is required by admitting air from the auxiliary reservoir to the top of emergency-piston 1. When a reduction in the train-pipe pressure is made for an emergency-stop, the auxiliary pressure is admitted to the top of emergency-piston 1, overcoming the train-pipe pressure on the smaller area of emergency-valve 2, allowing the air to pass through valve 2 and holes 14 directly to the brake-cylinder through passage F. My device differs from this arrangement by constantly having the auxiliary pressure above and train-pipe pressure below emergency-piston 1 when the brakes are released, the auxiliary pressure being on top of piston 1 at all times.

My device consists, essentially, of the following parts. (Clearly shown in the attached drawing.) The drawing shows in section the parts described.

A and B are the outer shells surrounding the parts of the device.

C is the main train-pipe passage, from which leads the feed-port D to the main triple valve and the auxiliary reservoir. E is a port also connecting with the auxiliary reservoir and having constant communication with said reservoir.

F is a passage connecting with brake-cylinder.

The essential parts of my device are, the emergency-piston 1, working in the cylinder 4, said cylinder having connected with it the base 5, on which is made the double valve-seat 6 and 7. The emergency-valve body 2 has on its upper surface a valve 9, of rubber or other suitable material, held in place by the stem 10 and lip 11. The lower stem 12 of emergency-valve 2 has at its lower end the nut or screw 13, which forms a shoulder, on which rests the check-valve 3, said check having its seat on shell A. A plug 15 is shown at the bottom of check-valve 3 to admit of putting together emergency-valve 2 and check-valve 3, said plug 15 making check-valve 3 a continuous and air-tight body. The construction of the apparatus is such that when emergency-valve 2 is firmly seated the shoulder on nut 13 raises check-valve 3 from its seat on shell A, as shown by passage 18. Through emergency-valve 2 is the passage 16, opening from chamber 23 between valve 2 and check-valve 3, said passage 16 being continued through the upper stem 10 of emergency-valve, allowing the air freely to pass to the central hole in cylinder 4. The emergency-piston 1 has a lower stem or rod 17, sliding in central hole of cylinder 4, so grooved as to freely allow air to enter cylinder 4 from passage 16 to under side of emergency-piston 1.

The operation of my device is as follows: Air from the train-pipe enters through passage C under check-valve 3 through passage 18, forcing emergency-valve 2 and its rubber face 9 to seats 6 and 7. Spring 21 is of sufficient strength to overcome weight of valve 2 and piston 1 and must be capable of seating valve 2 when pressure in chamber 23 equalizes with the pressure in brake-cylinder. The air also follows through passage 16, around stem 17, to under side of emergency-piston 1, forcing piston 1 against its seat on shell B, said piston 1 having a valve 19, of leather or other suitable material, on its upper surface, preventing air from flowing around piston 1 to auxiliary reservoir. A gasket 20 between cylinder 4 and shell B is provided to prevent flow of air from auxiliary reservoir to brake-cylinder when brakes are applied in a service-stop if piston 1 should move slightly until resting on stem 10. When it is desired to make an emergency-stop, the air is suddenly exhausted from under side of piston 1 around stem 17 through passages 16 and 18, thereby causing piston 1 to descend, opening emergency-valve 2, under which conditions the pressure in train-pipe raises check-valve 3, allowing the air to exhaust from train-pipe through passage C under check-valve 3 through passages 14 and F to brake-cylinder. When the pressure in brake-cylinder equalizes with train-pipe pressure, emergency-valve 2 is seated by spring 21; but when brake-cylinder pressure accumulates above train-pipe pressure emergency-valve 2 is forced from its seat, allowing check-valve 3 to drop to its seat on shell A, thus retaining the brake-cylinder pressure. Under these conditions the brake is fully applied, the brake-cylinder pressure holding check-valve 3 to its seat. When it is desirable to release the brakes, air is admitted through train-pipes to main triple valve, the emergency-valve 2 seating, as above described, and preventing train-pipe pressure from entering brake-cylinder. At the same time train-pipe pressure flows through passages 16 and 18 to cylinder 4, forcing piston 1 to its seat. It is not essential that piston 1 should have the seating material on its upper surface or that piston 1 should make a tight joint on shell B; but it is desirable, inasmuch as with said seat 19 all the air which passes to auxiliary reservoir must pass through feed-port D and also through the mechanism of the main triple valve. This feature is especially desirable in long trains to prevent the charging of the auxiliary reservoirs too rapidly.

As above stated, my device is intended for use only when emergency-stops are made and when a reduction of from fifteen to twenty pounds pressure is made in the train-pipes; but there is an action of some parts of my mechanism when a service-stop is made, as follows: When the train-pipe pressure is reduced from five to eight pounds, no motion is communicated to any part of my device; but if this reduction is repeated until the brake-cylinder pressure and auxiliary pressure equalize and the train-pipe pressure is still further reduced below brake-cylinder pressure then emergency-valve 2 opens by the higher pressure on its upper surface overcoming spring 21 and allowing valve 3 to seat and prevent the escape of air from brake-cylinder to train-pipe.

Having thus described my invention, what I claim is—

1. In a fluid-pressure valve for quick-action train-brakes, a piston 1, exposed to reservoir-pressure on one side and to train-pipe pressure on the other side and independent of the control of the main piston of the triple valve, combined with the valve 2, controlling a passage between the train-pipe and the brake-cylinder, a port 16, opening communication between the under side of piston 1 and the under side of valve 2, and a check-valve 3, connected to valve 2 by a connection of such length as to keep check-valve 3 off its seat when valve 2 is seated, thus affording open communication for fluid-pressure from the train-pipe to the under side of piston 1, substantially as forth.

2. In a fluid-pressure valve for quick-action train-brakes, a valve 2, controlling a passage between the train-pipe and a brake-cylinder, held on its seat by train-pipe pressure, and a piston 1, exposed to train-pipe pressure on the side next the valve and to reservoir-pressure on the side opposite the valve, so that the pressure from the reservoir tending to open valve 2 will be resisted by the train-pipe pressure on both the piston and the valve, combined with a check-valve attached to valve 2 by a connection of such length as to keep the check-valve off its seat when valve 2 is seated and an open passage from the chamber above the check-valve to the under side of piston 1, substantially as set forth.

In testimony that I claim the foregoing as my invention I have signed my name, in presence of two witnesses, this 3d day of September, 1891.

HARRY G. MANNING.

Witnesses:
E. A. MANNING,
C. H. HUNGERFORD.